United States Patent

Jakobs et al.

[11] 3,931,546
[45] Jan. 6, 1976

[54] OVER-VOLTAGE PROTECTION CIRCUIT
[75] Inventors: Hans Jakobs, Schaumburg Township, Cook County; Charles J. Juhnke, Deerfield, both of Ill.
[73] Assignee: C. E. Niehoff & Co., Chicago, Ill.
[22] Filed: May 28, 1974
[21] Appl. No.: 474,011

[52] U.S. Cl. .................... 317/16; 317/31; 317/50; 317/33 SC; 317/33 VR; 317/13 R
[51] Int. Cl.² ...................... H02H 3/20; H02H 7/06
[58] Field of Search....... 317/31, 16, 50, 13, 33 VR, 317/33 SC; 322/28; 320/64, 61; 321/14, 2

[56] References Cited
UNITED STATES PATENTS

| | | | |
|---|---|---|---|
| 3,469,168 | 9/1969 | Harland, Jr. et al. | 322/28 X |
| 3,488,560 | 1/1970 | Konopa | 317/31 |
| 3,581,150 | 5/1971 | Kirk et al. | 317/31 X |
| 3,651,379 | 3/1972 | Moisand et al. | 317/33 SC X |
| 3,702,962 | 11/1972 | Wohr et al. | 317/33 SC X |

*Primary Examiner*—William M. Shoop
*Assistant Examiner*—Patrick R. Salce
*Attorney, Agent, or Firm*—Mason, Kolehmainen, Rathburn & Wyss

[57] ABSTRACT

An over-voltage protection circuit for an electric generating machine having a controlled rectifier for shunting the output winding of the machine in the event of an over-voltage condition includes impedance means connected in series with the controlled rectifier and regulation circuitry responsive to current flowing through the impedance means for preventing the excitation of the field when the controlled rectifier is conductive. An improved triggering circuit including a Zener diode and a transistor switch is employed to assure proper triggering of the controlled rectifier.

12 Claims, 3 Drawing Figures

OVER-VOLTAGE PROTECTION CIRCUIT

BACKGROUND OF THE INVENTION

This invention relates generally to electric generating power systems and, more particularly, to over-voltage supression circuits for electric alternators.

Several techniques for providing over-voltage supression for electric generating machines are known. Such systems generally employ a plurality of silicon controlled rectifiers connected to the output windings of the machine for shunting the output windings in the event that an over-voltage condition occurs. Such representative prior art systems are described in U.S. Pat. Nos. 3,488,560 issued Jan. 6, 1970 to Richard L. Konopa and 3,581,150 issued Apr. 8, 1970 to Thomas F. Kirk et al.

An over voltage condition on an electric machine may occur, for example, as a result of a rapid change in the electrical load connected to the machine. Such a change may occur, for example, in an automobile alternator system when the battery has been accidently or otherwise disconnected, and subsequently a heavy current consuming device such as a blower motor is switched off. When the over-voltage condition is sensed by the normal voltage regulating system, the field excitation to the alternator is terminated. However, due to the inductance of the field winding and residual magnetism present in the alternator, a high voltage transient may be generated even though field excitation has ceased.

Accordingly, voltage protection systems have been developed for isolating the output windings of the alternator from the load connected thereto to prevent the over-voltage condition from damaging the accessories connected to the alternator, such as, in the case of an automobile, light bulbs and the radio and the like. The isolation is generally provided by connecting an electronic shunt switch across the output windings of the alternator to shunt the output voltage to a source of common potential upon the occurence of the over-voltage condition. Series switching systems have also been used to disconnect the alternator from the load when the over-voltage condition occurs.

Because of the high speed nature of the over voltage transients, the response time of the over-voltage protection circuitry must be made sufficiently fast to insure that the output windings are isolated from the load before any damage to the load can occur. In addition, particularly in voltage regulated systems, provision must be made to assure that the excitation of the field is terminated when the over-voltage protection circuitry is activated to prevent undue dissipation of power by the alternator and by the protection circuitry.

In prior art systems, particularly in those employing controlled rectifiers in the transient protection circuitry, a Zener or avalanche diode is generally employed to sense the output-voltage of the machine. The avalanche device is generally connected to the control or gate electrode of the controlled rectifier, and the output voltage of the machine operates to avalanche or break down the diode in the reverse direction when a predetermined level has been reached. The avalanche current flows through the diode and is applied to the gate electrode of the controlled rectifier to render the controlled rectifier conductive. The voltage regulator for the machine is provided with means for sensing the output voltage of the machine and for terminating the excitation of the field when the over-voltage condition occurs to prevent excessive power dissipation by the controlled rectifiers.

While these techniques provide over-voltage protection for an electric generating machine, problems may arise as a result of an undesired triggering of the protection circuitry occurring when no over-voltage condition is present. Such an undesired triggering may occur as the result of a voltage transient, heat or by a failure of one of the components in the protection circuit. In addition, due to the high surge currents being switched, a controlled rectifier may exhibit a delayed turn off characteristic and remain conductive for several cycles following the termination of a proper gate triggering signal. In prior art circuits, when an undesired triggering in the absence of an over-voltage condition or a delayed turn off occurs, the field excitation is not terminated by the voltage regulator because the triggering of a controlled rectifier causes the output voltage to drop below the regulating voltage. Under such circumstances, full field excitation is provided to the alternator, thereby causing the full output current of the alternator to be applied to the protection system, a condition which could result in damage to the protection system or to the alternator.

Other problems associated with prior circuits occur as a result of the substantial voltage drop across the avalanche device which triggers the controlled rectifiers. Because all of the triggering current for the controlled rectifiers must flow through the avalanche device, a relatively high power Zener diode must be used. In addition, the voltage appearing across the Zener diode results in a lower voltage drive to the controlled rectifiers, thereby making the triggering of the controlled rectifiers marginal in some cases.

Accordingly, it is an object of the present invention to provide an improved over-voltage supression circuit having an improved triggering system.

It is another object of the present invention to provide an improved over-voltage protection system that deenergizes the field of the machine whenever the over-voltage protection system is activated, regardless of the cause of the activation.

Another object of the present invention is to provide an over-voltage protection system for an electric machine that is more reliable than systems according to the prior art.

In accordance with the preferred embodiment of the invention, a plurality of controlled rectifiers are connected to the output windings of the machine to shunt the output windings to a source of common potential when the controlled rectifiers are rendered conductive. Impedance means, such as a low value resistor or semiconductor diodes are connected in series with the controlled rectifiers to provide a means for sensing the current flowing through the controlled rectifiers. The voltage regulator is connected to the impedance means and is responsive to current flowing therethrough to prevent excitation of the field when the controlled rectifiers are in a conductive state.

The triggering circuit for the controlled rectifiers comprises a sensing circuit including a Zener diode or other breakdown device and a transistor switch connected to the sensing circuit and to the control electrodes of the controlled rectifiers.

When the output voltage of the machine reaches a value sufficient to break down the Zener diode, the transistor switch is rendered conductive to provide a gate control signal to the controlled rectifiers, thereby rendering the gate controlled rectifiers conductive. The current flowing through the controlled rectifiers causes a voltage to appear across the impedance means, and this voltage is sensed by the voltage regulator to prevent further excitation of the field. Sensing the conduction of each controlled rectifier at the output terminal thereof provides a positive indication of current flow through the controlled rectifier, thereby causing the excitation of the field to be terminated regardless of the event that caused the rectifier to become conductive. The transistor switch provides a positive gate control signal to the controlled rectifiers to assure positive turn-on.

DESCRIPTION OF THE DRAWINGS

FIG. 1a is a partial schematic diagram of the circuit of FIG. 1 showing an alternative embodiment of the impedance means connected in series with the controlled rectifiers.

DETAILED DESCRIPTION OF THE INVENTION

Figure 1:
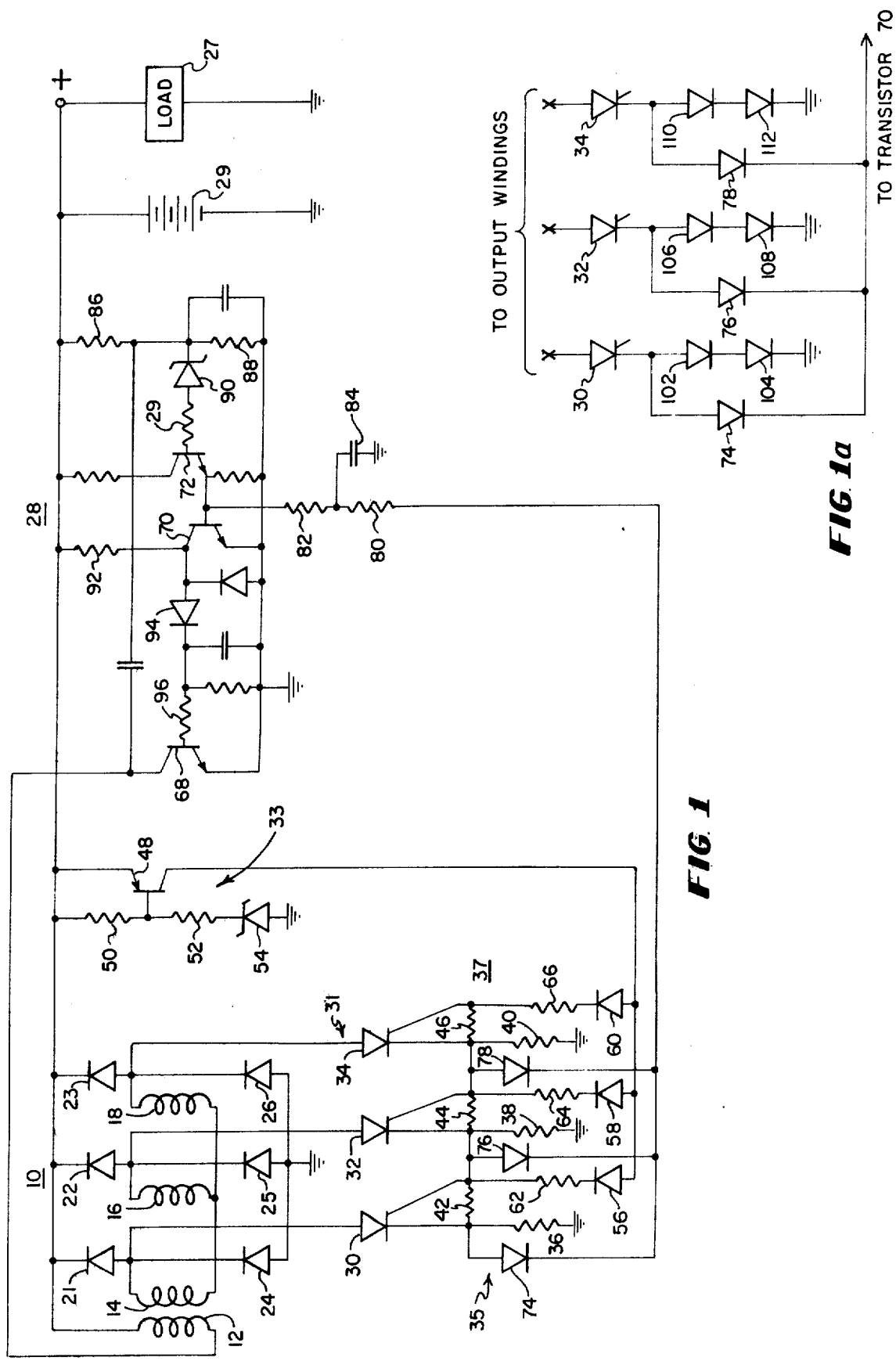
FIG. 1 is a detailed schematic diagram showing the over-voltage protection system according to the invention used in conjunction with a voltage regulated three-phase alternator.

Having reference now to the drawings, and initially to FIG. 1, there is illustrated an alternator circuit designated as a whole by the reference numeral 10. In the illustrated arrangement, the alternator 10 is a three phase machine having a field or excitation winding 12 and three wye connected output windings 14, 16 and 18. In order to apply a rectified DC voltage to the ground and relatively positive output terminals of the machine when the field winding 12 is energized, six diode rectifiers 21-26 are connected in conventional fashion between the output windings 14, 16 and 18 and the alternator output terminals. Since the alternator 10 is intended for use with an automobile or other vehicle, a storage battery 29 and a load 27 representing the various electrically-powered components of the vehicle are connected in parallel with one another across the alternator output terminals. The excitation of the field winding 12 is controlled by means of a voltage regulator circuit generally designated by the reference numeral 28.

In accordance with an important feature of the present invention, the alternator 10 is provided with a novel over-voltage protection circuit generally designated as 37. In general, the over-voltage protection circuit 37 includes a thyristor section generally designated as 31 for shunting the alternator output in response to over-voltage conditions, together with a novel trigger circuit generally designated as 33 for operating the thyristor section in response to an over-voltage condition. In accordance with another feature of the invention, there is provided a control circuit generally designated as 35 for disabling the regulator circuit 28 in response to operation of the thyristor section 31.

Proceding now to a more detailed description of the illustrated embodiment of the invention, the thyristor section 31 includes thyristor means, embodied in FIG. 1 by the silicon controlled rectifiers 30, 32 and 34, connected to the output windings 14, 16 and 18, respectively. Although silicon controlled rectifiers are used as the thyristor means in this embodiment, it should be appreciated that any triggerable electronic switching device that remains conductive after triggering for as long as current flow through the main electrodes is maintained, such as, for example a triac or other controlled rectifier can be used. Impedance means, comprising in this embodiment resistors 36, 38 and 40 are connected in series circuit with one of the main terminals of the controlled rectifiers 30, 32 and 34. In the embodiment shown, the resistors are connected between the cathodes of the controlled rectifiers and ground, however they may be connected anywhere in the series circuit containing the controlled rectifiers. Bias resistors 42, 44 and 46 are connected between the gate and cathode electrodes of the controlled rectifiers 30, 32 and 34, respectively.

The improved triggering circuit 33 for the rectifiers 30, 32 and 34 comprises switch means including a transistor 48 having an emitter connected to the positive output terminal of the alternator and a collector connected to each of the gates of the controlled rectifiers by means of diodes 56, 58, 60 and resistors 62, 64, 66. Voltage sensing means, including a breakdown or avalanche device such as a Zener diode 54, are connected in a series circuit including a pair of resistors 50 and 52 between the output terminals of the alternator. The base of the transistor 48 is connected to the junction of the resistors 50 and 52.

The voltage regulator circuit 28, which may be of a conventional design, comprises in this embodiment, transistors 68, 70 and 72 and associated components, and serves as a means for energizing the field coil 12. The collector of the transistor 68 is connected to the field winding 12, and the base of the transistor 70 is connected to the resistors 36, 38, 40 by means of diodes 74, 76, 78 and a low pass filter including resistors 80, 82 and a capacitor 84 for filtering switching transients.

In operation, the transistor 48 is normally maintained in a non-conductive state by the resistor 50. Upon the occurrence of an over-voltage transient of sufficient magnitude to break down or avalanche the Zener diode 54, current flows through the series combination of the base-emitter junction of transistor 48, the resistor 52 and the diode 54. The current flowing through the base emitter junction of the transistor 48 forward biases the junction to render the transistor 48 conductive. Although not absolutely necessary, in a preferred embodiment, the transistor 48 is driven into saturation, thereby raising the collector potential of the transistor 48 to substantially the potential of the positive output terminal of the alternator 10. The positive drive potential from the collector of the transistor 48 causes the gates of the controlled rectifiers 30, 32 and 34 to be forward biased, thereby rendering the controlled rectifiers conductive effectively to shunt the output windings 14, 16 and 18 to substantially ground potential.

The shunting of the output windings causes current to flow through each of the controlled rectifiers and the respective impedance means connected in series therewith. For example, when the controlled rectifier 30 is rendered conductive, current flows through the loop comprising the series combination of the diode 25, the windings 14, 16, the controlled rectifier 30 and the resistor 36. The current flowing through each of the resistors 36, 38 and 40 from the respective controlled rectifiers 30, 32 and 34 causes a positive voltage (with respect to ground) to appear at the cathode electrode of each of the controlled rectifiers 30, 32 and 34. The positive voltage is sensed by means of the diodes 74, 76 and 78 and applied to the voltage regulator to terminate the excitation of the field.

In the voltage regulator circuit 28 shown in FIG. 1, the transistor 68 is rendered conductive to apply excitation currents to the field 12 when the output voltage of the alternator 10 drops below a predetermined value. The voltage regulator operates in a conventional fashion such that when the voltage drops below a predetermined value determined by the ratio of the resistors 86 and 88 and the breakdown voltage of the Zener diode 90, the transistor 72 is rendered non-conductive and, in turn, renders transistor 70 non-conductive. The transistor 68 is then rendered conductive by current flowing from the positive terminal of the alternator 10 through the resistors 92 and 96 and the diode 94. Conversely, when the output voltage exceeds the predetermined value, the Zener diode 90 is driven into a breakdown or avalanche region and provides bias current to the transistor 72 to render the transistors 70 and 72 conductive. When the transistor 70 is rendered conductive, the current flowing through the resistor 92 is shunted to ground, thereby removing the forward biasing potential from the base-emitter junction of the transistor 68 and rendering transistor 68 non-conductive. The remaining components in the voltage regulator circuit are conventional and serve to provide the functions of transient supression and bias.

The voltage appearing at the cathode of any of the controlled rectifiers 30, 32, 34 that is rendered conductive is sensed and used to cause the voltage regulator to terminate excitation of the field 12. By sensing the output voltage at one of the main terminals such as the cathode of one of the controlled rectifiers, the conductive condition of the controlled rectifier may be sensed regardless of the mechanism that caused the controlled rectifier to become conductive. For example, if the rectifier 30 is rendered conductive as a result of an over-voltage condition or for any other reason, the current flowing through the rectifier 30 will result in a voltage at the cathode thereof. The voltage at the cathode of the rectifier 30 is applied to the base of the transistor 70 by means of the diode 74 and the low pass network including the resistors 80, 82 and the capacitor 84. The application of the positive voltage to the base of the transistor 70 renders the transistor 70 conductive and causes the transistor 68 to be rendered non-conductive, thereby terminating the field excitation current. Similarly, if either of the controlled rectifiers 32 and 34 is rendered conductive, the positive voltage occuring at the cathode thereof will render the transistor 70 conductive and the transistor 68 non-conductive to terminate field excitation. The diodes 74, 76 and 78 serve as isolation diodes to prevent interaction between the controlled rectifiers 30, 32 and 34 which may occur when only one or two of the controlled rectifiers is rendered conductive.

Referring to FIG. 1a, there is shown an alternate embodiment of the impedance means that is connected in series with the controlled rectifiers 30, 32 and 34. In the embodiment of FIG. 1a, resistors 36, 38 and 40 have been replaced by the series connected diode pairs 102, 104; 106, 108; and 110, 112. In the embodiment of FIG. 1a, current flowing through the series connected diodes causes a voltage to appear at the cathode of the controlled rectifiers proportional to the forward junction drop of each of the series connected diodes and the number of such diodes connected in series. Any number of series connected diodes may be used provided that the voltage at the cathode of the controlled rectifiers is of a sufficient amplitude to overcome the forward junction drops of the emitter-base junction of the transistor 70 and the diodes 74, 76 and 78.

Figure 2:
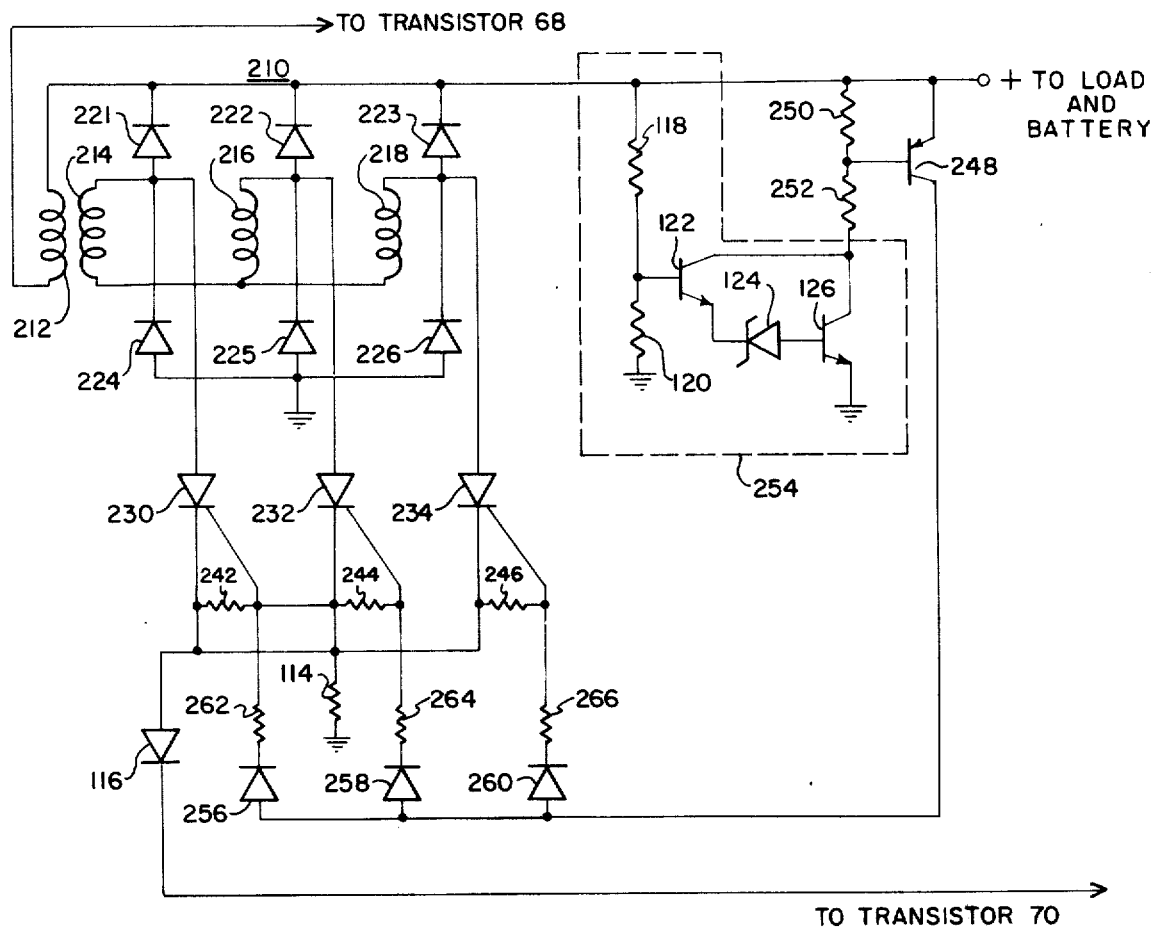
FIG. 2 is a partial schematic diagram of an alternative embodiment system according to the invention utilizing a common impedance means and an alternate form of the breakdown means for the triggering circuit.

The embodiments heretofore described have employed a separate impedance means for each controlled rectifier to be monitored. In an alternate embodiment, it is possible to use a single sensing means to detect the conductivity of any one of the controlled rectifiers. Such an embodiment is shown in FIG. 2. The embodiment of FIG. 2 shows an alternator denoted generally as 210 having a field winding 212; output windings 214, 216, 218; rectifier diodes 221-226; controlled rectifiers 230, 232, 234; and associated triggering and biasing circuitry. The function of the alternator system of FIG. 2 is similar to that of FIG. 1, and in general, components in FIG. 2 that are analogous to similar components in FIG. 1 are indicated by numbers that are greater by 200 than similarly denoted parts in FIG. 1. For example, the alternator 210 of FIG. 2 is analogous to the alternator 10 of FIG. 1.

The embodiment of FIG. 2 uses a single impedance means, in this embodiment the resistor 114 connected to the cathodes of each of the controlled rectifiers 230, 232, 234 to sense the conduction of any one of the last-mentioned controlled rectifiers. The junction of the controlled rectifiers and the resistor 114 is coupled to the transistor 70 of the voltage regulator by means of a diode 116 to terminate the excitation of the field as in the case of the circuit of FIG. 1.

The circuit shown in FIG. 2 also shows another embodiment for the triggering circuit for the controlled rectifiers. The trigger circuit of FIG. 2 shows a switching transistor 248 connected to a pair of resistors 250, 252 analogous to the transistor 48 and resistors 50, 52 of FIG. 1, respectively. The Zener diode 54 is replaced by the circuitry 254 which comprises a pair of resistors 118 and 120, transistors 122, 126 and a Zener diode 124.

In operation, the output voltage applied to the load is sensed by the resistive divider network comprising the resistors 118 and 120. When the output voltage reaches the predetermined maximum level, the voltage at the junction of the resistors 118 and 120 has sufficient amplitude to break down the Zener diode 124, thereby rendering the transistors 122 and 126 conductive. When transistor 126 is rendered conductive, the transistor 248 is also rendered conductive to provide a triggering signal to the controlled rectifiers 230, 232, 234.

A reliable triggering source for the controlled rectifiers is particularly necessary in circuits such as the one shown in FIG. 2 which use a single impedance means for sensing the conductance of the controlled rectifiers. For example, suppose the controlled rectifier 230 were rendered conductive due to an over-voltage condition, and the controlled rectifiers 232 and 234 had not yet been rendered conductive because of the phase of the voltages at the anodes thereof. Under such conditions, the current flowing through the controlled rectifier 230 would result in a positive voltage appearing at the cathodes of the controlled rectifiers 232 and 234. In order to trigger a controlled rectifier, the gate electrode must be raised to a potential higher than the cathode electrode. Hence, the gate potential required to trigger the controlled rectifiers 232 and 234 is higher when the rectifier 230 is conductive. Since the triggering circuit according to the invention uses a saturated transistor, such as transistors 48 and 248, to trigger the controlled rectifiers, substantially the full output voltage of the alternator is applied to the gate of the controlled rectifiers to assure proper triggering. Such proper triggering is difficult to achieve in systems utilizing a Zener diode in series with the gate electrodes due to the voltage drop appearing across the Zener driode and the resistor 114.

Although particular preferred embodiments have been described in the specification and shown in the drawings, it should be noted that modifications which may be readily made by one skilled in the art still fall within the scope and spirit of the invention.

What is claimed as new and desired to be secured by Letters Patent of the United States is:

1. For use with an electric generating machine having an excitation winding, a pair of power output terminals and an output winding electrically coupled to said output terminals, an overvoltage protection system comprising:

energizing means for applying excitation current to said excitation winding;

thyristor means having main electrodes connected in a series circuit with said output winding, and a control electrode;

voltage sensing means connected to said control electrode, said voltage sensing means being responsive to voltage generated by said output winding for rendering said thyristor means electrically conductive between said main electrodes when said voltage reaches a predetermined level; and current sensing means coupled to one of said main electrodes for sensing the current flow through said main electrodes, said current sensing means being further connected to said energizing means and including impedance means connected in a series circuit with said main electrodes, wherein said impedance means includes a semiconductor diode connected in series with said main electrodes, said diode being responsive to the current flow through said main electrode for providing a voltage thereacross representative of said current flow, said energizing means being responsive to said current sensing means for preventing the application of excitation current to said excitation winding when the current flowing through the main electrode reaches a predetermined level.

2. For use with an electric generating machine having an excitation winding, a pair of power output terminals and an output winding electrically coupled to said output terminals, an overvoltage protection system comprising:

energizing means for applying excitation current to said excitation winding;

thyristor means having main electrodes connected in a series circuit with said output winding, and a control electrode;

voltage sensing means connected to said control electrode, said voltage sensing means being responsive to voltage generated by said output winding for rendering said thyristor means electrically conductive between said main electrodes when said voltage reaches a predetermined level; and current sensing means coupled to one of said main electrodes, said current sensing means including impedance means connected in a series circuit with said main electrodes for sensing the current flow through said electrodes, said current sensing means being further connected to said energizing means, said energizing means being responsive to said current sensing means for preventing the application of excitation current to said excitation winding when the current flowing through said main electrode reaches a predetermined level, said energizing means including switch means having a conductive and a nonconductive condition of operation connected to said excitation winding and second voltage sensing means connected to said switch means and to said output terminals, said second voltage sensing means being responsive to output voltage at said output terminals for altering the condition of operation of said switch means in response to the output voltage to maintain said output voltage substantially constant, said switch means being connected to said impedance means and operable to said nonconductive condition of operation in response to current flow through said impedance means.

3. A system as recited in claim 2 wherein said impedance means includes a resistor.

4. A system as recited in claim 2 wherein said thyristor means includes a controlled rectifier having gate, cathode and anode electrodes.

5. A system as recited in claim 4 wherein said impedance means is connected to one of said cathode and anode electrodes and one of said output terminals.

6. A system as recited in claim 5 wherein said voltage sensing means includes transistor switch means connected to said gate electrode.

7. A system as recited in claim 2 wherein said switch means includes a low pass filter.

8. A system as recited in claim 7 wherein said switch means includes a transistor.

9. A system as recited in claim 2 further including a second output winding electrically coupled to said output terminals, and second thyristor means connected in series with said impedance means.

10. A system as recited in claim 2 wherein said switch means includes transistor means having base, emitter and collector electrodes, said emitter and collector electrodes being connected in series with said field coil and said base electrode being connected to said voltage sensing means.

11. A system as recited in claim 2 wherein said voltage sensing means includes breakdown means including a Zener diode connected in a series circuit with said output winding.

12. A system as recited in claim 11 wherein said voltage sensing means includes transistor means connected to said Zener diode and to said thyristor means, said transistor being responsive to a breakdown of said Zener diode for rendering said thyristor means conductive when the voltage generated by said output winding reaches said predetermined level.

* * * * *